April 2, 1968
D. G. FAIR
3,376,389
INTERROGATORY TELEMETERING SYSTEM AND APPARATUS
Filed Oct. 1, 1964
6 Sheets-Sheet 1
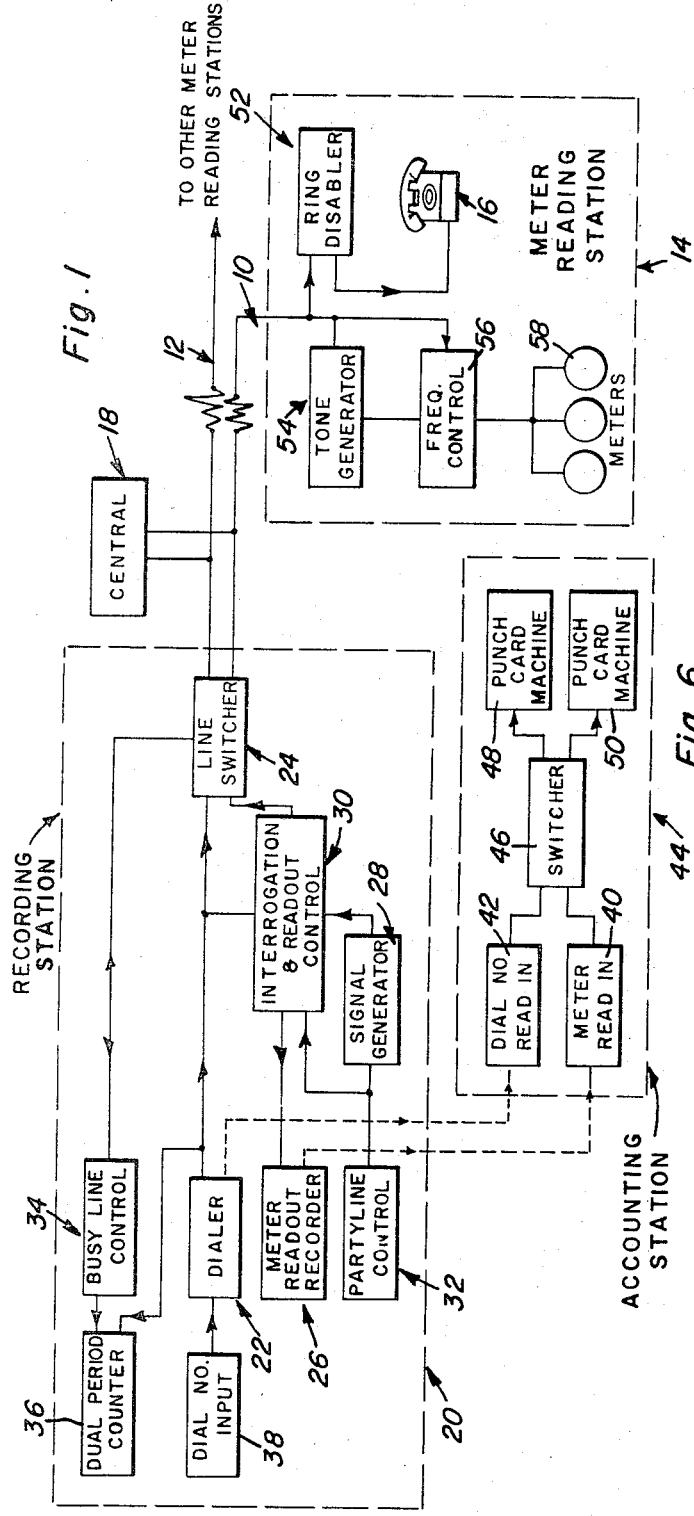
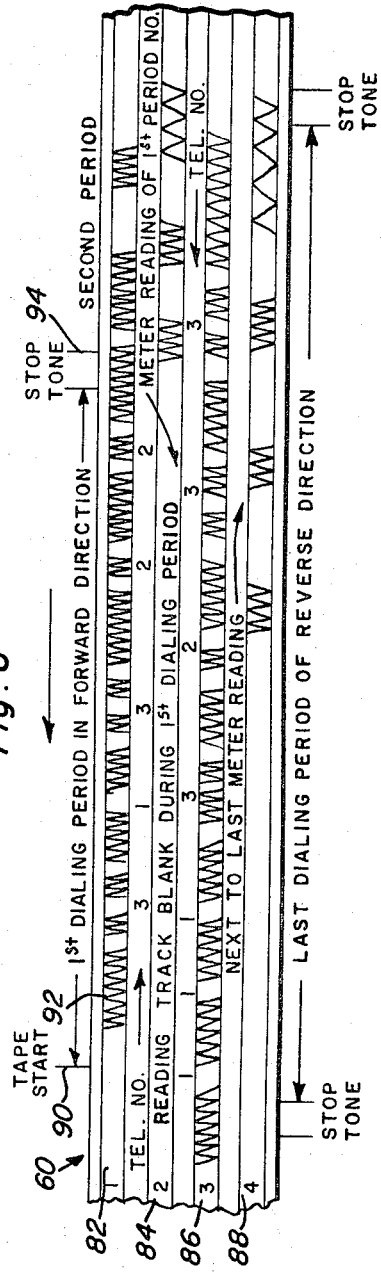
Donald G. Fair
INVENTOR.
BY *Clarence A. O'Brien*
*and Harvey B. Jackson*
Attorneys

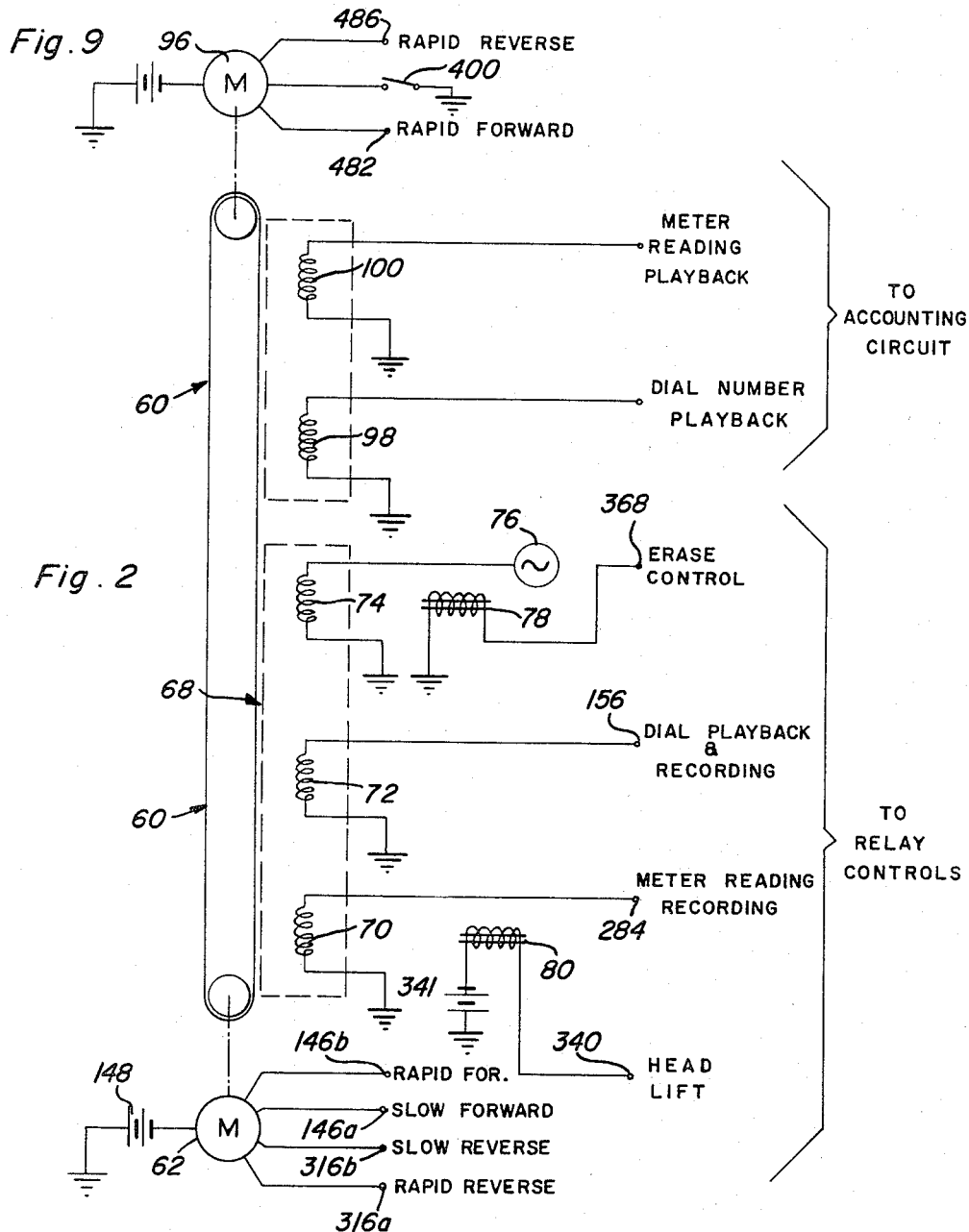

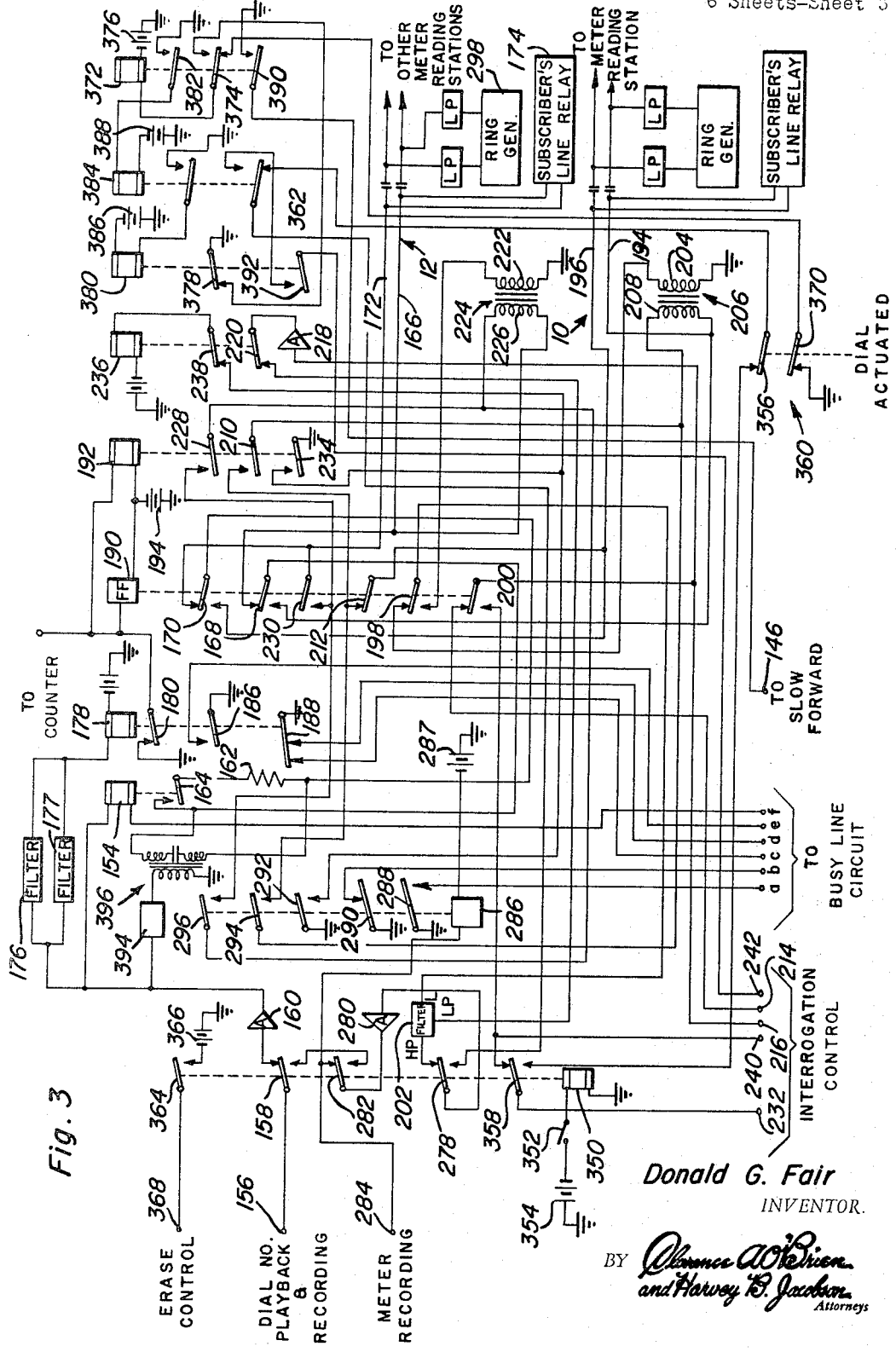

April 2, 1968     D. G. FAIR     3,376,389
INTERROGATORY TELEMETERING SYSTEM AND APPARATUS
Filed Oct. 1, 1964     6 Sheets-Sheet 4

Donald G. Fair
INVENTOR.

April 2, 1968          D. G. FAIR          3,376,389
INTERROGATORY TELEMETERING SYSTEM AND APPARATUS
Filed Oct. 1, 1964          6 Sheets-Sheet 5
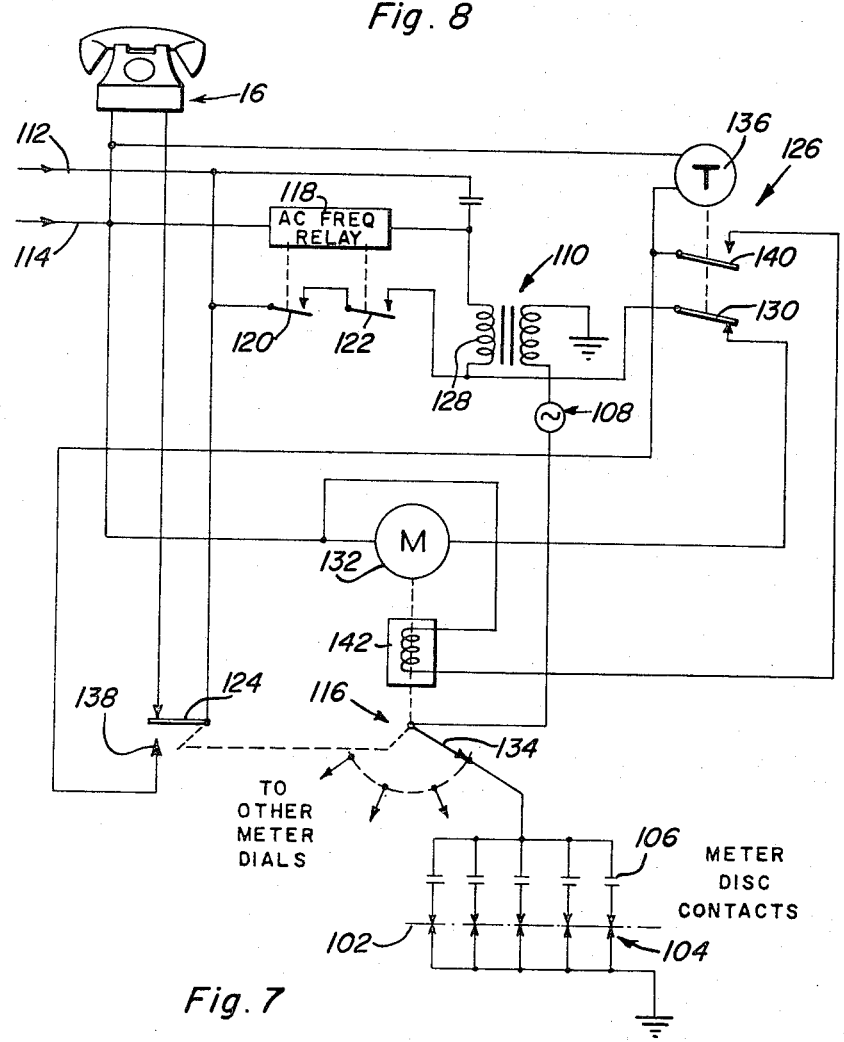
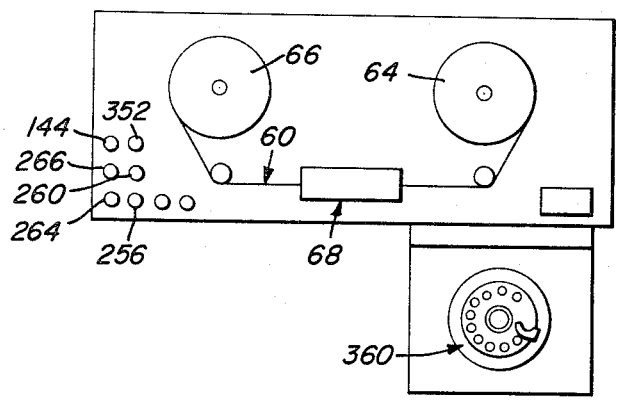
Donald G. Fair
INVENTOR.

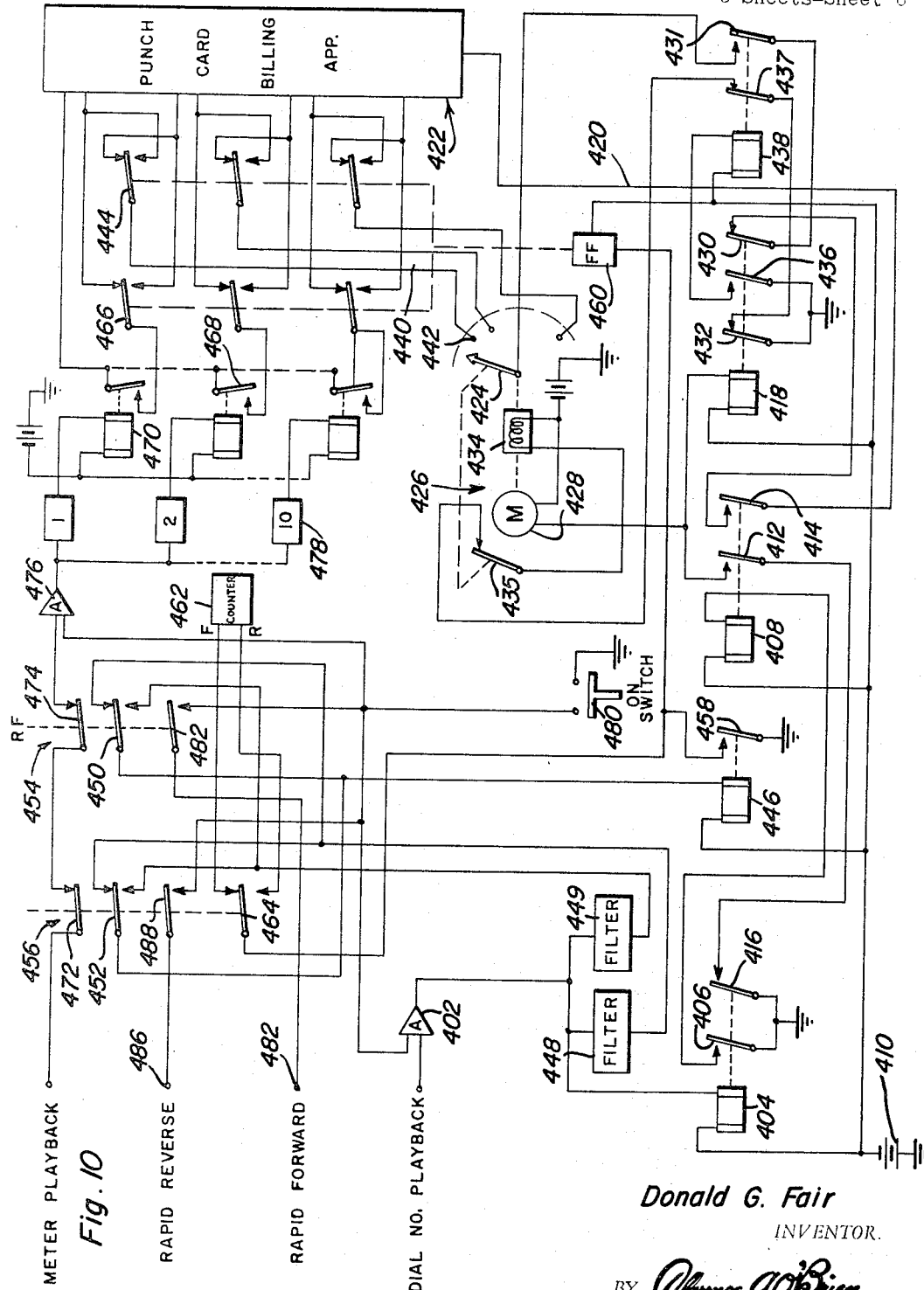

{ # United States Patent Office 3,376,389
Patented Apr. 2, 1968

3,376,389
INTERROGATORY TELEMETERING SYSTEM
AND APPARATUS
Donald G. Fair, 1830 N. 110th St.,
Omaha, Nebr. 68144
Filed Oct. 1, 1964, Ser. No. 400,681
18 Claims. (Cl. 179—2)

ABSTRACT OF THE DISCLOSURE

A multi-track record tape controls operation of an automatic dialer at a recording station from which meter reading stations are interrogated through telephone lines to effect meter readout. The meter readout data is recorded on the same tape which may then be inserted into a tape reader from which the readout data is transferred to an accounting circuit through which the information is converted into form suitable for billing subscribers.

---

This invention relates to a system for telemetering information from a plurality of meter reading stations to a recording station at which the information is collected in such form and in an automatic manner for conversion at an accounting station into digital information suitable for handling by automatic billing equpment. The system of the present invention is therefore particularly suitable for reading the meters of utility companies such as electric, gas and water meters in an automatic fashion with the information being conveyed over the communication lines of a common carrier such as telephone lines.

It is therefore a primary purpose of the present invention to provide a system through which subscribers to a common carrier communication system may have all of their utility meters automatically read with the information being conveyed over the communication lines to a recording station from which the collected information may be digitized at an accounting station and placed in a form from which billing of the subscribers may be rendered. The system of the present invention will thereby eliminate reading of the various meters of a subscriber by personnel and reduce the time involved in collecting and correlating the information necessary to bill the subscribers to the utility services being metered.

In accordance with the foregoing object, the various meters located at a subscriber's home are automatically read in response to interrogation signals dispatched over the communication or telephone lines. The meter reading information is then returned over the telephone lines to the recording station from which the interrogation signals originated. At the recording station, the meter readings are recorded on recording medium and the recording medium sent to an accounting center at which the information is transferred to computers or card handling machines into which the information on the recording medium is read. Thus, this information may be punched on cards from which billing of the subscribers is rendered.

The system of the present invention embodies various novel operational attributes including facilities for handling busy line situations, interruptions in meter reading readout, varations in subscriber dialing periods and meter readout periods. The system also features facilities for adding or removing subscribers to the system. The system therefore includes automatic dialing facilities through which the subscribers are automatically dialed so that interrogation signals may be dispatched to the various meter reading stations and the meter reading information returned associated with the subscribers' dial numbers for use in connection with the meter reading information at the accounting station. The system may also be installed at the meter reading locations without interference with the usual communication arrangement available to the subscriber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a block diagram illustrating the system of the present invention.

FIGURE 2 is a schematic circuit diagram of a portion of the system at the recording station.

FIGURE 3 is a circuit diagram of the interrogation and readout controls at the recording station.

FIGURE 6 illustrates a portion of the recording medium utilized in connection with the system of the present invention.

FIGURE 7 is a simplified top plan view of the apparatus associated with the system of the present invention at the recording station.

FIGURE 8 is an electrical circuit diagram of the apparatus associated with the system at a typical meter reading station.

FIGURE 9 is a circuit diagram of the tape reader mechanism associated with the apparatus of the present system at the accounting station.

FIGURE 10 is a circuit diagram of the information readin equipment associated with the system at the accounting station.

Figure 4:
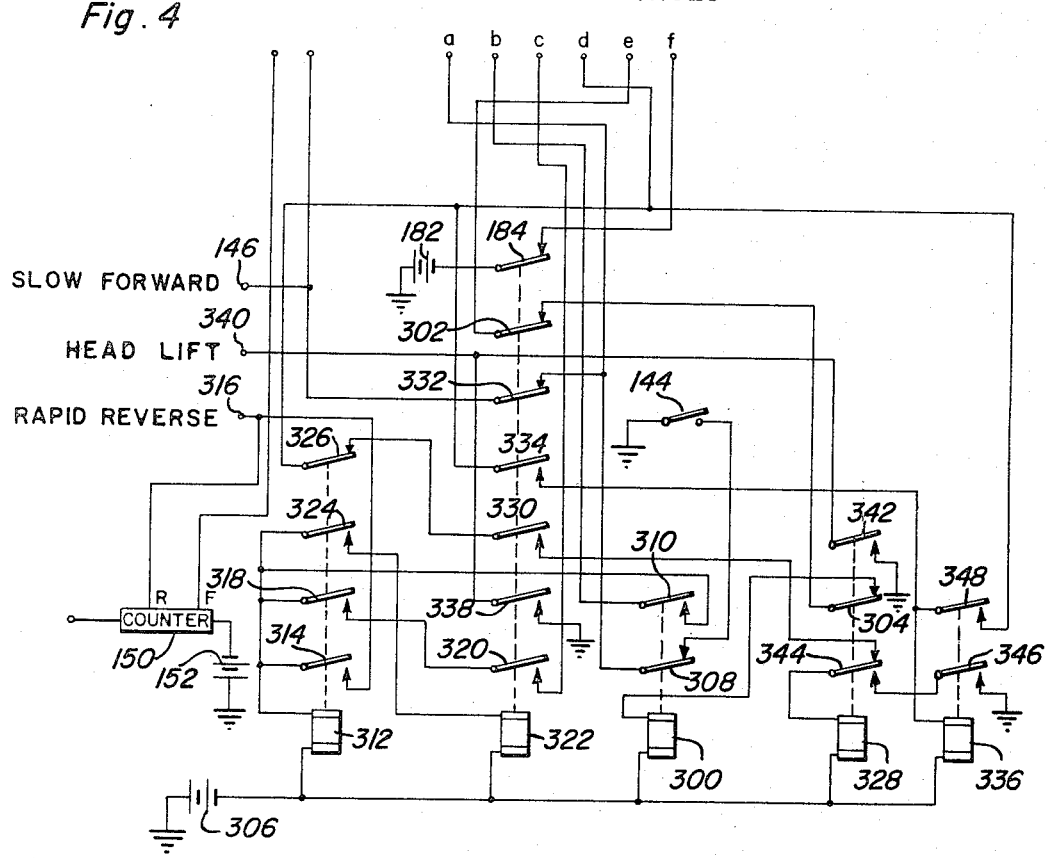
FIGURE 4 is a circuit diagram showing the busy line controls at the recording station.

Referring now to the drawings in detail, and initially to the block diagram of FIGURE 1, the system is shown in connection with a telephone communication system utilizing at least two leased telephone lines 10 and 12 to which various subscribers are connected. Accordingly, the meters located in or adjacent to the premises of the various subscribers, may be read in addition to establishing a communication hook-up through the telephone instrument 16 at each subscriber's premise. Telephone line 10 is therefore diagrammatically shown in FIGURE 1 as connected to the meter reading station 14 associated with one of the subscribers at which the usual telephone instrument 16 is located. Also, each of the telephone lines 10 and 12 is connected to the central office 18 at which equipment is located for dispatch of ring signals to the various subscribers when a corresponding station selective signal is received from the recording station 20 to which the telephone lines 10 and 12 are connected.

The station selective signals to the subscribers are automatically dialed by means of an automatic dialing apparatus 22, the dial tone signals being dispatched over lines 10 or 12 depending upon the condition of the line switcher equipment 24 associated with the apparatus at the recording station. It will become apparent, that while a subscriber is being dialed through one line 10 for example, meter reading information may be conveyed through the other line 12 at the same time for recording by the meter readout recorder 26. The lines 10 and 12 are therefore interchanged each operational cycle to simultaneously transmit station selective signals and meter readout signals. Readout is obtained in response to interrogation signals dispatched to a previously dialed meter reading station, the interrogation signals originating from the signal generator component 28 and properly routed and spaced relative to the incoming readout signals through the interrogation and readout control 30. Depending upon the nature of the interrogation signals dispatched, different parties at the respective meter reading stations will respond so as to thereby restrict interrogation to any particular group of meter reading stations desired. A party line control component 32 is therefore provided for this purpose in order to vary the number of different interrogation signals generated. Also, facilities are provided in the form of a busy line control 34 so that upon dialing of any particular meter reading station, a busy signal in the line will produce a waiting period after which the same subscriber will be re-dialed so that the interrogation signals may again be dispatched to the same station. The dialer and the busy line control are therefore connected to a dial period counter so that following each dialing period, a count will be added while each busy signal encountered will subtract a count in order to maintain an accurate count of the meter reading stations responding. In order to add or replace dial numbers to the dialer apparatus 22 as subscribers enter or leave the system, a dial number input 38 is connected to the dialer so as to accommodate the change.

After the subscribers to the system have been dialed and the meters read, the information recorded by the meter readout recorder 26 and the dialing numbers recorded in the dialer mechanism 22, are fed into the read-in components 40 and 42 at the accounting station 44. Thus, the meter readout information is correlated with the corresponding dial numbers of the subscribers and converted into digital information through switcher apparatus 46 so that the information may be dispensed in the form of punch cards from the punch card machines 48 and 50 suitable for handling by billing equipment. Each card will therefore contain the telephone dial number of the subscriber and the meter dial readings obtained from the remote meter reading stations.

At each meter reading station 14, the ringing device associated with the telephone instrument 16, is disabled by the disabling device 52 upon receipt of a coded interrogation signal immediately following connection of the telephone line to the meter reading station dialed. The coded interrogation signal is in the form of two superimposed tones of different frequencies which are intermittently interrupted in order to obain successive readings of the various meter dials at the meter reading station. The interrogation signal thus triggers a tone generator 54 so as to dispatch a tone over the line to which the meter reading station is connected at a frequency reflecting the meter dial being read at a particular instant. The output frequency of the generator 54 is therefore controlled by the frequency control 56 which in turn is operatively connected to the various indicator dials 56 of the meters. Accordingly, following each interruption of the interrogation signal, another indicator dial will correspondingly change the output frequency of the tone generator 54 through the frequency control 56 in order to dispatch a readout signal corresponding to the meter reading. These meter readout signals are therefore routed through the control 30 to the meter readout recorder 26 during a readout period corresponding to the previous dialing period.

The dial numbers of the various subscribers are recorded on recording medium such as the magnetic tape generally referred to by reference numeral 60 in FIGURE 6 from which station selective signals originate. The tape may be mounted for movement by the usual tape transport mechanism of a commercial tape recorder and playback unit, the transport mechanism being driven by a reversible tape transport motor 62 as diagrammatically illustrated in FIGURE 2. In accordance with the present invention, the tape may be driven in a forward direction from a full supply reel 64 as diagrammatically illustrated in FIGURE 7 onto a takeup reel 66 after being threaded through the head assembly 68 by grounding either terminals 146a or 146b. When the supply reel 64 is exhausted, the tape transport mechanism is automatically reversed in direction by grounding terminal 316b or 316a and the heads within the assembly 68 appropriately shifted into contact with other signal tracks on the tape 60 in order to resume automatic dialing and recording of readout signals from the various meter reading stations being dialed. The specific details of the tape transport mechanism and head shift device form no part of the present invention. The head assembly 68 includes a readout signal recording head 70, a dial playback and recording head 72 and an erase head 74 to which an erase oscillator 76 is connected. A head shifting solenoid 78 is provided for shifting the dial and erase heads during recording as will hereinafter be explained. A head lift solenoid 80 is also associated with the meter recording head 70 through which the heads 70 and 74 may be raised out of contact with the recording tape during intervals when this is desired, as will hereafter be explained.

With continued reference to FIGURE 6, it will be observed that the tape 60 includes four signal tracks 82, 84, 86 and 88. On the first signal track 82, the subscriber's dial numbers are recorded along varying lengths of the tape corresponding to dialing periods which are separated by periods during which stop tones are recorded. The first dialing period beginning with the tape start position 90, is begun with an initial recorded tone 92 and terminated by the first stop tone interval 94. A portion of the tape along the second track 84, is blank during the first dialing period but immediately beginning with the second dialing period of the first signal track 82, the meter readout signals are recorded on the second track 84 corresponding to the meter reading station dialed by the dialing number information on the first dialing period of track 82. Dialing numbers are recorded on the third track 86 in the reverse direction so that upon reversal of the tape transport when the supply reel is exhausted, playback of telephone dial pulses from track 86 may be effected for continued automatic dialing until the tape is brought back to its start position. Corresponding readout signals are then recorded on track 88. It will therefore be apparent, that after the tape 60 has been run through the equipment diagrammatically illustrated in FIGURE 7 in both the forward and reverse directions, all of the subscribers will have been dialed and the meters at the respective meter reading stations read and recorded in the form of readout signals on tracks 84 and 88 of the tape which also bear the corresponding dial number information. The tape may then be brought to a tape reader such as diagrammatically illustrated in FIGURE 9, including a tape transport motor 96 through which the tape may be driven in a forward and reverse direction in order to read-in the information thereon to the equipment at the accounting station. Accordingly, associated with the tape reader are a dial number playback head 98 and a meter reading playback head 100 with facilities (not shown) for appropriately shifting the heads and reversing the drive of the tape in order to feed the information on the tape into the accounting circuit.

*Meter reading operation*

On the premises of each subscriber, a unit is located hooked to the telephone instrument 16 and the various indicator dials which have been modified in accordance with the present invention so as to replace the dial pointers by a contact bearing disc 102 as diagrammatically illustrated in FIGURE 8. The disc may contain five sets of contacts 104 through which ground connections may be established for different combinations of the five tuning capacitors 106 associated with the indicator dial. The parallel connected tuning capacitors 106 are therefore adapted to be connected in parallel with a permanent tunable tank circuit in the standard oscillator 108 constituting a tone generator the output of which is inductively coupled by the transformer 110 to the telephone lines 112 and 114 connected to the reading station. The oscillator 108 is therefore successively connected to each of the modified indicator dials through the step switch assembly 116 so that the output of the tone generator will be at a frequency which corresponds to the angular position of the dial pointer replaced by the contact disc assembly 102. It will be apparent, that depending upon the angular position of the contact disc 102, different combinations of contacts 104 will establish different output frequencies respectively corresponding to nine digits, zero being represented by a position of the disc 102 wherein none of the contacts 104 are engaged. Thus, the output of the tone generator 108 will be at a frequency reflecting the meter reading. Operation of the step switch assembly 116 in order to switch frequency control of the oscillator 108 to another indicator dial, is controlled by interrogation signals dispatched over the telephone lines 112 and 114 to which the A.C. frequency relay 118 responds by closing the relay switches 120 and 122. When this occurs, the ring disabler switch 124 is actuated at the same time that the step switch assembly 116 is advanced in order to prevent disturbance of the subscriber or interference with the readout cycle under the timing control of the timing relay 126.

A readout cycle is initiated when the interrogation signal is dispatched from the recording station in the form of two steady tones carried by lines 112 and 114 following successful dialing of the meter reading station to which these lines are connected. The chance of voice frequencies in the lines operating relay 118 are lessened because of the two tone nature of the interrogation signal and the slow response of the relay 118 avoiding short signal triggering. When the relay 118 does respond, the series connected switches 120 and 122 are closed by respective energization of the frequency tuned coils (not shown) in the relay 118 in order to connect the winding 128 of transformer 110 across the lines so that a response tone from oscillator 108 may be returned. Also connected across the lines 112 and 114 at the same time, through the normally closed relay switch 130, is the driver 132 of the step switch assembly 116. The movable step switch contact 134 is thereby advanced to its first operative position establishing a connection from the first modified indicator dial to the tank circuit of the oscillator 108 as aforementioned. Advancement of the movable contact 134 is also operative to actuate the disabler switch 124 which in its initial position connects the telephone instrument 16 across the lines. Accordingly, the telephone instrument is disconnected from the line during the readout cycle. The disabler switch 124 is however also operative when actuated to complete an energizing circuit for the timing relay device 136 across the telephone lines through contact 138. The timing relay 136 does not however operate until the elapse of a predetermined period in order to terminate the readout cycle. Interruption of the interrogation signal at the recording station for a period of one-half second for example, causes the relay 118 to be momentarily de-energized after which re-energization thereof by the interrogation signal causes the step switch driver 132 to advance the movable contact 134 to its next operative position establishing a connection from the next modified indicator dial to the oscillator 108 in order to change the output frequency thereof in accordance with the reading of the next meter dial. When all of the indicator dials have been so read, in response to intermittent interruption of the interrogation signal, there will be no readout signal from the oscillator 108 for a period of one second after which the timing relay 136 operates. When operated, the timing relay opens the relay switch 130 so as to disconnect the driver 132 from the telephone lines and at the same time closes the relay switch 140 so as to establish an energizing circuit for the magnetic release device 142 across the telephone lines causing the movable contact 134 to return to its initial position. When this occurs, the disabler switch 124 is returned to its normal position interrupting the circuit to the timer device 136. The meter reading circuit is then restored to its initial condition for receiving either an interrogation signal from the recording station or the normal telephone call through the telephone instrument 16. Power for operating the timer 136 motor 132, release device 142 and oscillator 108 could be obtained from an A.C. source located at the meter reading station. In such case the switches 120 and 122 would make the connection to the power source rather than the telephone lines, this being desirable where sufficient operating current is not available from the telephone lines.

*Meter interrogation*

The automatic dialer of the present invention selects the telephone dial number of a meter reading station so as to dispatch the interrogation signal thereto in the form of the two tones aforementioned after the station has been successfully dialed through the telephone central office. As indicated, these interrogation signals trigger a relay at the meter reading station so as to short the telephone lines before any ring signal is dispatched from the central office. The interrogation signal also triggers meter reading operation and by the interruptions thereof, successive readings of the various indicator dials are obtained. Accordingly, the generation of the superimposed tones for coding the interrogation signals, the routing of these signals and the interruption of the signals is achieved at the recording station.

Referring now to FIGURES 2 and 3, at the start of a readout cycle, all relays are de-energized with the supply reel full and the take-up reel empty. The dial head 72 is then in contact with track 82 of the tape 60 so that when the start switch 144 (FIGURE 4) is closed, the slow terminal 146 of the transport motor 62 is grounded through normally closed relay switches 3320 and 308 in order to complete an energizing circuit from the source of voltage 148 through terminal 146a to initiate normal movement of the tape 60 in a forward direction. The counter 150 (FIGURE 4) is then also conditioned for operation when an energizing circuit therethrough is completed from the source of voltage 152 as will be hereafter explained in order to establish a count for each dialing period. After about a two second interval, a steady tone is picked up by the dial head 72 from portion 92 on track 82 of the tape to supply an amplified pulsing signal to the relay coil of the dialing relay 154 shown in FIGURE 3 The dialing relay is of the A.C. pulsing type, following the amplified dial pulses from the dial head and connected to the dial head through terminal 156, the normally closed relay switch 158 and the dial amplifier 160. The dialing relay is thereby operative to connect the resistance 162 across the telephone line 10 or 12 so as to seize the line finder equipment 174 at the telephone central office. The relay 154 therefore has associated therewith a normally open relay switch 164 which when closed connects the resistor 162 to conductor 166 of line 12 through the closed contacts of relay switch 168, the other side of the resistor being connected through closed contacts of relay switch 170 to the other lead 172 of the line 12. The initial tone on the tape is thereby operative through the relay 154 to seize the central equipment 174 to which the line 12 is connected in preparation for the dialing which follows. The dialing signal which corresponds to the interruption in the tone recorded on the track 82 during the first dialing period, will thereby select the line to a particular subscriber through the equipment at the central office. After dialing, a stop tone recorded on the track 82 of the tape during the stop tone interval 94, is picked up by the dial head 72 and passed through the slot filter 176 when the tape is moving at normal speed after being amplified by the amplifier 160 in order to pulse the stop tone relay 178. When moving at a rapid speed the tape recorded stop tone is passed by slot filter 177.

The stop tone relay is an A.C. pulsing type relay which responds to the stop tone frequency passed by the slot filters and includes a normally open relay switch 180 closed at the end of each dialing period by the stop tone so as to complete an energizing circuit for the counter 150 in order to count the dialing period as aforementioned. The relay switch 180 when closed therefore connects the counter to ground in order to complete the energizing circuit from the voltage source 152 as shown in FIGURE 4. It will also be observed from FIGURE 4, that a source of voltage 182 is connected through normally closed relay switch 184 to the dialing relay 154, operation of the dialing relay thereby being interrupted in connection with a busy line waiting period is under control of the busy line circuit illustrated in FIGURE 4, conditioned by closing of the grounding relay switch 186 and opening of the grounding switch 188 when the stop tone relay 178 senses the end of a dialing period. At the same time, closing of the relay switch 180 completes energizing circuits for the line switching relay 190 and the interrogation relay 192 connected to a common source of voltage 194.

The line switch relay 190 is of the flip-flop type whereby each successive stop tone signal is operative through the stop tone relay 178 to switch the relay from one position to the other position. In the position illustrated in FIGURE 3, the relay switches 168 and 170 are operative in conjunction with the closing of the dialing relay switch 164 to connect the resistance 162 across the conductors 166 and 172 of telephone line 12. At the end of the dialing period, the stop tone is operative to energize the relay 190 as aforementioned so as to actuate the relay switches 168 and 170 and thereby interchange the telephone lines across which the resistance 162 is connected by closing of the relay switch 164 of the dialing relay 154. Accordingly, while the dial tone signals are applied to the telephone lines 12 during the first dialing period, in order to dial one subscriber, the next subscriber is dialed during the second dialing period through the telephone line 10 by actuation of the relay switches 168 and 170 establishing connections to the conductors 194 and 196 of the telephone line 10. Also associated with the relay 190, are relay switches 198 and 200. In the position illustrated in FIGURE 3, relay switch 198 connects the line filter 202 to the secondary 204 of line transformer 206. The line transformer 206 is therefore also provided with a primary 208 one terminal of which is connected to conductor 194 of the line 10 while the other terminal of the primary is adapted to be connected to the other conductor 196 of the line 10 upon closing of the relay switch 210 connected in series with the closed relay switch 212 of the relay 190. Thus, in the illustrated position of the relay 190, the relay switches 198 and 212 are operative to inductively couple the line 10 through transformer 206 to the line filter 202 for transmittal of readout signals from a meter reading station as will be hereafter explained in greater detail. Relay switch 200 in the illustrated position, on the other hand, is operative to connect one source of an interrogation tone from terminal 214 to the line connected to another source of an interrogation signal tone at terminal 216 so that both signal tones may be superimposed and supplied to the amplifier 218 from which the amplified interrogation signal is conducted through the normally closed relay switch 220 to the low pass terminal of the line filter 202 connected by the relay switch 198 to the winding 204 of the line transformer 206. Thus, the relay 190 is operative in the illustrated position to dispatch interrogation signals over the line 10 in order to trigger meter reading operation at one meter reading station for readout through the line 10 while dialing signals are being dispatched over the line 12 to dial another meter reading station. When the relay 190 is pulsed at the end of the dialing period as aoforementioned, the relay switches are displaced to their other operative positions effecting a functional interchange between the lines 10 and 12 so that interrogation signals and readout may then occur through the line 12 while the line 10 is being utilized to dial another meter station. Actuation of the relay 190 at the end of the first dialing period will therefore actuate the relay switches 168 and 170 in order to then connect the resistance 162 across line 10 as aforementioned. Actuation of the relay switch 198 will connect the secondary 222 of line transformer 224 to the line filter 202 while at the same time the primary 226 is adapted to be connected across the leads 166 and 172 of the line 12 upon closing of the relay switch 228 connected in series with the actuated relay switch 230 of the relay 190. The line transformer 224 is thereby rendered operative to transmit readout signals from the line 12 as well as to supply interrogation signals thereto inasmuch as interrogation signals from the line filter will then be conducted through the actuated relay switch 198 to the winding 222 of the line transformer 224. The actuated relay switch 200 will then also be operative to establish a path from the terminal 232 to the amplifier 218 for supply of a different interrogation signal to the line 12 through the line filter 202 as compared to the inerrogation signal supplied to the line 10 as aforementioned. Thus, there will be different interrogation signals to which the meter reading stations must respond depending upon the lines to which they are connected.

At the same time that the stop tone is operative to pulse the flip-flop relay 190, the interrogation relay 192 is also energized, this relay being of the slow release type having a one second release period. When the relay 192 is energized, relay switches 210 and 228 are closed in order to establish the connections to the line transformers as aforementioned in connection with the operation of the relay 190 for the dispatch of interrogation signals to the meter reading stations. Relay ground switch 234 is also closed in order to complete and energizing circuit for the interrupter relay 236 by means of which the interrogation signals are intermittently interrupted in order to operate the step switch at the meter reading station as aforementioned and thereby obtain successive readings of the indicator dials.

The interrupter relay 236 is of the slow operate and slow release type having a one-half second operational delay period and a one-half second release period. Operation of the interrupter relay 236 is therefore initiated by the stop tone upon closing of the relay switch 234 and is also controlled by the readout signal as will be hereafter explained. When the interrupter relay is operated, it opens its own energizing circuit by actuation of the normally closed relay switch 238 while at the same time, the normally closed relay switch 220 is opened in order to interrupt the amplified interrogation signal transmitted therethrough from the line filter 202 and the amplifier 218.

Figure 5:
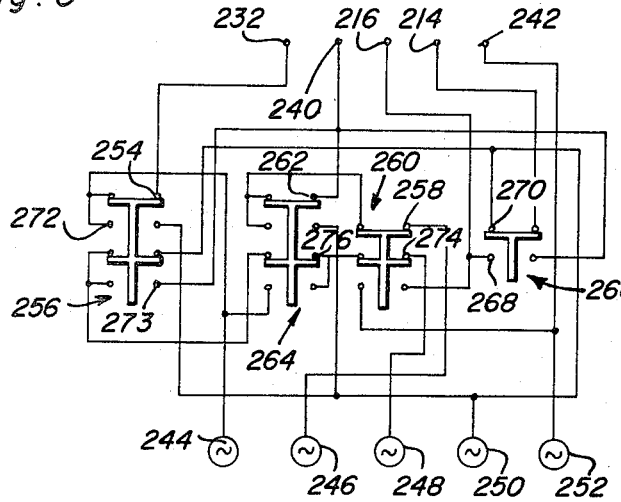
FIGURE 5 is a circuit diagram showing the party line controls and interrogation signal generating facilities.

The interrogation signal as aforementioned, is composed of two superimposed signal tones of different frequencies supplied to the line filter 202 through terminals 232, 240, 216, 214 and 242. With continued reference to FIGURE 3 and to FIGURE 5, it will be observed that the interrogation signals are derived from the different frequency outputs of five oscillators 244, 246, 248, 250 and 252. Different combinations of the outputs of two of the five oscillators are therefore superimposed on each other and supplied to the line filter 202 so as to furnish the interrogation signals aforementioned. Normally, two different interrogation signals are made available for two party operation through the telephone lines 10 and 12 when none of the party line control keys are actuated. Under this condition, the output of oscillator 244 is supplied through the bridged contacts 254 of the four-party key 256 to the terminal 232 so that it may be superimposed on the output of the oscillator 246 through the bridged contacts 258 of the eight party key 260 and the bridged contacts 262 of the six party key 264 before supply to the terminal 240. The superimposed outputs of oscillators 244 and 246 are thus connected by the actuated relay switch 200 to the amplifier 218 from which they are routed to the line filter 202. Should it be desired to obtain one party operation, the one party key 266 is actuated from the position illustrated in FIGURE 5 so as to bridge the contacts 268 in order to interconnect the terminals 216 and 240 and thereby by-pass the relay switch 200. Also opening of the previously bridged contacts 270 will disconnect the superimposed outputs of oscillators 248 and 250 from terminal 214 otherwise conducted through the relay switch 200 in one position thereof in order to prevent supply of a different interrogation signal for the respective lines 10 and 12 that would otherwise occur under two party operation.

By actuating the four party key 256, the output of oscillator 246 is superimposed upon the output of oscillator 248 by bridging of the contacts 272 and 273 supply of the superimposed outputs to the terminal 240 and supply to the line filter 202 in the actuated position of the relay switch 200. In the position of the relay switch 200 shown in FIGURE 3, the output of oscillator 244 is connected through bridged contacts 272 with the output of the oscillator 250 for supply to the terminal 214 through the bridged contacts 270 in order to furnish another interrogation signal. Accordingly, two additional interrogation signals are made available in addition to the two signals previously described in connection with the two party operation, when the four party key 256 is actuated.

When the six party key 264 is actuated, the outputs of oscillators 244 and 248 are combined to furnish a fifth interrogation signal and the outputs of oscillators 246 and 250 are combined to provide the sixth interrogation signal. Actuation of the eight party key 260 will combine the outputs of oscillators 244 and 252 to furnish the seventh signal while the outputs of oscillators 250 and 252 are combined to furnish the eighth signal. Accordingly, by control of the party keys 256, 264, 260 and 266, as much as eight different interrogation signals are made available in order to correspondingly restrict response of the meter reading stations to the respective interrogation signals. In this manner, different classifications of subscribers may be established and meter readout selectively restricted to particular classes of subscribers inasmuch as only the desired meter reading stations will respond to the interrogation signals as selected under control of the party line control keys.

*Meter readout operation*

Meter readout signals are alternatively received through either line 10 or 12 which are operationally interchanged at the end of each dialing period as aforementioned. A readout signal in one of the lines is therefore supplied to the line filter 202 through the line transformer 206 or 224. The line filter will pass the readout signal through its high pass terminal and through the normally closed relay switch 278 to the readout amplifier 280 from which the amplified readout signal is supplied to the meter recording head 70 through the relay switch 282 in its normal position illustrated in FIGURE 3. The meter reading head 70 is therefore connected to the engaged contact of the relay switch 282 through the terminal 284. The amplified readout signal is also applied to the readout control relay 286 for operation thereof from the voltage source 287. The readout control relay is of the slow release type and when energized closes a ground switch 288 in order to hold ground on the slow forward terminal 146 of the tape transport motor after forward movement thereof has been initiated and readout signals are being received. In view of the slow release period of the readout control relay 286, the relay switches thereof will remain actuated during the pauses between the readout signals in each readout cycle.

When the readout control relay is energized, it will also open the ground switch 290 through which operation of the busy line circuit is prevented as long as readout signals are present. At the same time, the ground switch 292 is closed in order to establish the energizing circuit for the interrupter relay 236 after its operation has been initiated by the stop tone as aforementioned. Operation of the interrupter relay 236 is therefore maintained as long as readout signals are available. Finally, energization of the readout control relay closes the normally open relay switches 294 and 296 by means of which the relay switches 210 and 228 of the interrogation relay 192 are by-passed in order to maintain the connections of the line transformers to the telephone lines after the stop tone period has ended. In view of the slow release period associated with the readout control relay 286, it will hold for a period after readout has been completed. When relay 286 releases switch 292 opens to stop the action of the interrupter relay 236. Switch 294 is also then opened so that the recording circuit connected to one of the telephone lines remains idle until dialing on the other line is completed and a stop tone again operates the stop tone relay 178, to again energize the counter, the flip-flop relay 190 and the interrogation relay 192. The cycle is then repeated with the lines interchanged.

*Busy line operation*

From the foregoing description, it will be apparent that during the automatic dialing operation, there is a pause during the stop tone period following the dialing period during which time response tone from the meter reading station is received if the line to the meter reading station is not busy. Thus, if there is a busy line, the busy line circuit is operative to effect rapid reverse movement of the tape back to the start position of the dialing period just completed at which start position there is a waiting period followed by a re-dialing operation. Although the circuit to be described is operative to effect one re-dialing cycle, it will be appreciated that it could be expanded with counting relays for as many re-dialing attempts as desired.

Referring therefore to FIGURES 3 and 4, it will become apparent that after a dialing period, the received tone is awaited while the stop tone relay 178 operates to close ground switch 186 in order to complete an energizing circuit for the slow control relay 300 through the normally closed relay switches 302 and 304. The relay 300 is of the slow release type and is connected to the source of energizing voltage 396. Energization of the slow control relay opens the relay switch 308 in order to open the connection of the slow forward terminal 146 of the tape transport motor to the ground switch 144. Thus, tape movement is stopped during the stop tone period unless a readout signal is received which energizes relay 286. At the same time, the normally open relay switch 310 is closed in order to establish an energizing circuit for a reverse control relay 312 through the normally closed ground switch 290 of the readout control relay. The relay 312 is of the slow operating type so that if a response tone is received during the stop tone period or before relay 312 operates, the ground switch 290 is opened by energization of relay 286 to interrupt the energizing current before operation of the relay 312 and thereby prevents reversal of tape movement. Also, when relay 286 is energized, switch 288 closes to re-establish the ground connection to the slow forward terminal 146a and tape movement may continue at a slow rate in the forward direction. However, if a busy line is encountered, no response tone is received during the stop tone period so that the readout control relay 286 remains de-energized permitting energization of the reverse control relay 312 and reverse movement of the tape.

Energization of the reverse control relay during the release period of relay 300 at the end of the stop tone period closes the relay switch 314 in order to transfer ground to the rapid reverse terminal 316a thereby reversing movement of the tape and producing a subtract pulse in the counter 150 in order to remove the count of the previous dialing period. Closing of the relay holding switch 318 also establishes a holding circuit for the reverse control relay following the stop tone period since ground will then be held by the relay switch 188 associated with the stop tone relay 178, to which the actuated relay switch 318 will then be connected in series with the actuated relay switch 320 of the waiting relay 322. The waiting relay 322 is therefore energized simultaneously with the reverse control relay 312 by closing of the relay switch 324. Energization of the relay 312 is also operative to open the relay switch 326 in order to prevent energization of the lift control relay 328 when the relay switch 330 is closed.

The waiting relay 322 is of the slow release type having a release period of a duration corresponding to a desired waiting period during which the busy line condition may be removed. When the waiting relay 322 is energized with the reverse control relay 312 in response to the busy line condition as aforementioned, the normally closed relay switch 184 is opened so as to disconnect the dialing relay 154 from its voltage source 182. Accordingly, dialing is prevented during the reverse movement of the tape to the beginning of its previous dialing period. The energizing circuit for relay 300 is interrupted by opening of the relay switch 302 while opening of the relay switch 332 prevents grounding of the slow forward terminal 146 during the waiting period. Closing of the relay switch 334 is also operative to establish an energizing circuit for the re-dial relay 336 since ground switch 188 of stop tone relay 178 therefore remains energized during the waiting period. Finally, energization of the waiting relay 322 closes the relay switch 338 in order to establish a ground connection to the head lift terminal 340 connected to the head lift solenoid 80 as shown in FIGURE 2 in order to complete an energizing circuit to the battery 341 (FIGURE 9). The head lift solenoid 80 when energized raises the readout and erase heads from the tape during rapid reverse and re-dial period.

The head lift relay 328 is of the slow release type energized during the release or waiting period of the relay 322 following reverse movement of the tape to the start of the previous dialing point when the relay switch 326 of the reverse control relay 312 is in its normally closed position. When energized, the relay 328 is operative to close the normally open ground switch 342 bypassing the ground switch 338 of the waiting relay 322. Also, energization of the relay 328 is operative through its relay switch 344 to establish a holding circuit through the relay switch 346 in series therewith since the re-dial relay 336 is energized for the entire waiting period as aforementioned. The re-dial relay 336 remains energized during the waiting period because the relay switch 326 closes upon de-energization of relay 312 stopping reverse movement of the tape. When initially energized during rapid reverse movement of the tape, the relay 336 is operative to close the relay switch 348 in order to establish its own holding circuit through the closed ground switch 188 of the stop tone relay 178.

When the tape approaches its start position, the stop tone preceding the dialing period portion of the tape is passed by filter 177 to operate the stop tone relay 178 opening the ground switch 188 through which the relays 312, 322 and 336 are held energized. De-energization of the reverse relay 312 immediately stops the motor from movement of the tape in the reverse direction. Relay 322 remains energized during the waiting period in view of its slow release operation during which waiting period, the relay 328 is energized as aforementioned. Thus, when the stop tone relay 178 again releases at the end of the stop tone or at the start position of the dialing period, relay 328 which is of the slow release type remains energized when the relay 336 is reenergized to close relay switch 346 of the holding circuit for the relay 328. Relay 328 is thereby operative through the relay switch 342 to complete a ground circuit for lift solenoid during the re-dial period to hold the heads raised off the tape after release of the waiting relay 322 and opening of relay switch 338. The heads are held raised off the tape during reverse movement of the tape when relay 322 is energized to prevent erase of any previous recording. Upon release of the waiting relay 322, the connection to the forward terminal 146 of the motor is re-established in order to initiate re-dialing operation.

At the end of the re-dialing operation, the stop tone relay 178 causes release of the re-dial relay 336 to also release the holding circuit for the lift control relay 328 and hold the relay 300 open until the stop tone relay releases and re-dialing is prevented. If a busy line persists, no tone will be received by the readout control relay 286 since the line filter 202 does not pass busy tones through the high pass terminal thereof. Thus, after the interrogation relay 192 releases, the line is released and the readout circuit will wait for the next cycle. No meter reading will therefore be recorded on the tape 60 corresponding to the dialing period for which a busy line was encountered if re-dialing was unsuccessful after the waiting period established by the busy line circuit.

*Dial number recording operation*

Facilities are also provided at the recording station for adding subscribers by recording additional dial tone signals on the tape 60. Toward this end, a recording relay 350 is provided, the relay being energized by closing of the dial number recording switch 352 connecting the relay to a source of energizing voltage 354 as shown in FIGURE 3. The output of the oscillator 244 connected to the terminal 232 is thereby transferred from the relay switch 200 of the flip-flop relay 190 to the dial actuated switch 356 by means of the actuated relay switch 358 associated with the recording relay 350. The dial actuated switch 356 is closed whenever the dial mechanism 360, as shown in FIGURE 7, is angularly displaced from its rest position in order to supply the output tone of oscillator 244 to the amplifier 280 through the normal position of the relay switch 362 connected in series with the actuated relay switch 278 associated with the recording relay 350. The amplified output of the oscillator 244 is therefore conducted through the actuated relay switch 282 in series with the actuated relay switch 158 to the dial head 72 for recording of the oscillator output tone. Energization of the recording relay is also operative to close the relay switch 364 in order to connect the voltage source 366 to the erase oscillator 76 in series with the erase head 74 through the terminal 368. The solenoid 78 is simultaneously operated to shift the erase and dial heads to the appropriate track for recording of the telephone dial signals.

For dial number recording purposes, the tape is started in a forward direction with the supply and take-up reels in the normal position. Energization of erase solenoid 78 then shifts the dial head 72 and erase head 74 from track 82 to 86. Thus, the tracks on the tape will be run past the heads in a direction reverse to the readout direction. At the end of the run, the dial and erase heads are shifted back to track 82 and the tape driven in the reverse direction toward the start position so as to record numbers in the reverse direction toward the start position so as to record numbers in the reverse order and to properly space the dialing periods, stop tone periods and readout periods. When the dialing mechanism 360 is rotated by a predetermined amount to dial a digit, the grounding dial switch 370 is closed so as to establish an energizing circuit for the dial control relay 372 through its normally closed relay switch 374. The dial control relay is therefore connected to a source of energizing voltage 376 and is of the slow release type having a 25 to 50 millisecond release period. When energized, the relay switch 374 is actuated so as to establish a holding circuit for the relay 372 through the normally closed ground switch 378 of the stop tone recording relay 380. At the same time, closing of the normally open relay switch 382 establishes an energizing circuit for the timing relay 384. The relays 380 and 384 are respectively connected to sources 386 and 388 of energizing voltage. Relay switch 390 is also closed upon energization of the dial control relay 372 in order to establish a ground connection to the slow forward terminal 146 of the tape transport motor.

As the tape moves forward past the dial head 72 and the erase head 74, the output tone from the erase oscillator 76 is recorded before the timing relay 384 operates to actuate the relay switch 362, recording of this tone following erasure of the tape by the erase head 74. Upon release of the dial mechanism after being rotated by an amount corresponding to a digit, the dial switch 356 is intermittently opened and closed a number of times correspond to the dialed digit producing interruptions in the recorded output tone of the oscillator 244. After the last digit is dialed, an uninterrupted tone is recorded before the timing relay 384 operates. The delay in operation of this relay may be 17 seconds for this purpose. The operating interval for the relay is therefore controlled so as to have an operating interval proportional in duration to the length of the longest dial number being recorded. Upon operation of the timing relay 384 following the delay period, the output of the oscillator 244 is disconnected by actuation of the relay switch 362 while at the same time the stop tone recording relay 380 is energized, this being a slow operating relay having a two second delay period. During the operational delay period, no tone is recorded so as to properly space the dial tone signals. When the relay 380 operates, the relay switch 392 is closed so as to connect the output of the oscillator 252 from terminal 242 to the actuated relay switch 362 of the timing relay in order to record through the dial head, a stop tone during the slow release periods of relays 384 and 372 de-energized by operation of the relay 380 when the holding circuit switch 378 is opened. Upon release of the dial control relay 372, the slow forward terminal 146 is disconnected from ground in order to stop the tape transport motor. The dial recording circuit is then ready to start a new cycle.

For "Touch Tone" dialing, the lines are seized by operation of the dialing relay 154 and dialing is accomplished through the line transformers 206 and 224. Tone is fed to these transformers through the filter 394 and the transformer 396 through the switches of the flip-flop relay 190. The output tone of oscillator 244 in this case is recorded on the tape as a steady tone applied to the lines and operative when picked up by the dial head to hold the dialing relay 154 so that dial tones may be superimposed on this steady tone when it is recorded.

It will be appreciated from the foregoing, that the apparatus at the recording station could be modified so that the automatic dialing facilities may be superseded by manual dialing of subscribers in order to trigger meter reading operation. The readout signals so obtained could be applied to indicator lamps from which a visual recording of the meters being read may be obtained. This procedure could be utilized in connection with those telephone dial numbers on the recording tape for which no readout was obtained because of a busy line.

*Accounting operation*

It will be apparent from the foregoing, that automatic dialing of the subscribers and recording of the readout signals is effected on tape on which the subscribers' dial numbers are also recorded for the automatic dialing operation. After the tape has been run through, it may be transferred to a tape reader mechanism as illustrated in FIGURE 9 wherein the dial head 98 contacts one dial number signal track of the tape as it is moved forwardly upon closing of the slow forward switch 400. The meter head 100 then contacts the adjacent track on which meter readings are recorded. Referring now to FIGURE 10, it will be apparent that dial tones picked up by the dial head are amplified by the amplifier 402 to pulse a dial read-in relay 404 which is of the A.C. pulsing type following the dial tone pulses. When energized, the relay 404 closes the ground switch 406 through which relay 408 is energized from the common source of voltage 410. The pulse counting relay 408 is of the slow release type having a 0.3-second release period. When energized, the relay 408 closes relay switches 412 and 414 in order to prepare a grounding path from relay switch 416 to the pulse counting relay 418 and prepare a path from the line 420 of the punch card billing apparatus 422 to the movable contact 424 of the step switch assembly 426 through normally closed relay switch 430 and normally opened relay switch 431. The relay 418 is also of the slow release type having a 0.3-second release period, this relay being energized simultaneously with the driver 428 of the stop switch assembly when relay 404 releases. Interruption in the dial tones temporarily releases the relay 404, but relay 408 remains energized because it is of the slow release type. Operation of the relay 418 by opening the normally closed relay switch 430 opens the path established between the line 420 and the movable contact 424 through the relay switch 414 of the relay 408. Also, opening of the relay switch 432 interrupts the energizing circuit for the magnetic release device 434 established through reset switch 435 and normally closed relay switch 437 so as to permit the driver 428 to advance the movable contact 424 from its initial position. Closing of the relay switch 436 upon energization of the relay 418 energizes the pulsing relay 438 which is also of the slow release type having a 0.2-second release period. Thus, upon de-energization of the pulsing relay 408, the driver advances the movable contact 424 to its first operative position at which it stops so that on the next pulse of the dial tone, the movable contact is prepared for being advanced to the second operative position. The steady stop tone at the end of the dialing period holds the relay 404 energized allowing the relay 418 to release after its 0.3-second release period in order to prepare a path to the release device 434 through the normally closed relay switches 432 and 437 when the energizing path to the relay 438 is opened through the normally open switch 436. The path between the line 420 and the movable contact 424 is then established. When relay 408 is energized, relay 438 has not yet released so that the signal pulse from the line 420 will be sent through the movable contact 424 to one of ten lines 440 connected to ten fixed contacts 442 of the step switch assembly 426. The signal pulse will be interpreted as a digit between one and ten dependent upon the position at which the movable contact 424 is stopped at the time the path is established from the line 420 to the movable contact.

Each of the read-in lines 440 is connected to one of two punch card machines through ten transfer switches 444. After the release period of the relay 438, the line 420 is disconnected and the path to the release device 424 reestablished so as to return the movable contact 424 to its start position. When the telephone dial number has been interpreted by the billing apparatus 422 the stop tone on the tape following the dialing period operates the stop tone read-in relay 446 inasmuch as the stop tone signal produced by movement of tape 60 at the normal speed is passed through slot filter 448 from the amplifier 402 to the relay 446 through the normally closed contacts of switch 450 or 452 of the rapid forward or rapid reverse control switch assemblies 454 and 456. Energization of the relay 446 closes the ground switch 458 so as to pulse the flip-flop relay 460 and the counter 462 through the switch 464 of the rapid reverse switch assembly 456. When pulsed, the flip-flop relay 460 causes the transfer switches 444 thereof to transfer the dial number read-in signals from one punch card machine to the other while at the same time read-in from the recorded meter readings are interchanged between the punch card machine by ten switches 466. Thus, dial numbers and meter readings are read into different punch card machines after which the machines are functionally exchanged so that each punch card will successively receive the dial number and the meter reading information while both machines are maintained operative at the same time.

At the beginning of an initial cycle, nothing is recorded on the meter reading track so that the dial number read into the apparatus 422 will correspond to meter readings read in through the switches 466 connected to ten relay switches 468 of meter read-in relays 470. The meter reading tones recorded on tape 60 are picked up by the meter head 100 and conducted through the normally closed switches 472 and 474 to the amplifier 476 and passed by one of ten slot filters 478 to operate a corresponding one of the ten relays 470. The relays 470 are of the slow operating type so that they will not recognize any short tone burst corresponding to the short intervals between the readout tones recorded on the tape 60 as the step switch 134 is advanced from one dial to another at a meter reading station. Thus, the meter reading information is converted into digital information on the same card on which the dial number was previously digitized. After all of the meter read-in tones are read onto the card, a silent interval on the tape 60 is encountered to allow the billing machines to dispense or eject the card and prepare for the next billing operation. The stop tone preceding the next dial period causes release of the flipflop relay 460 so as to effect the functional exchange between the punch card machines associated with the apparatus 422.

During the forward movment of the tape, the counter 462 counts the dialing periods. Any time rapid movement in a forward or reverse direction is desired, actuation of the switch assembly 454 or 456 will open the switches 472 and 474 to the meter head in order to prevent read-in of the meter readings while at the same time, the switch 450 or 452 is actuated to transfer the stop tone pulses produced by rapid tape movement through filter 449 to the relay 446 in order to maintain a count in the proper direction depending upon the position of the switch 464. The rapid switch assemblies are operative only upon closing of the on switch 480 in order to establish a ground connection to either the rapid forward terminal 482 through the actuated switch 484 or to the rapid reverse terminal 486 through the actuated switch 488.

From the foregoing description, the operation and utility of the system of the present invention will be apparent. The system may therefore be utilized for reading electric, gas, water or other meters automatically over the subscribers' telephone lines. Readings while described as being recorded on magnetic tape, could also be recorded on perforated paper tape. The tapes after undergoing a reading run, are sent to an accounting center at which the tapes feed the meter reading information associated with the telephone numbers of the subscribers. This information is punched on cards from which the billing is rendered. In the preferred form of the invention described, a four track magnetic tape is utilized, two tracks being used in the forward direction and the other two in the reverse direction when the tape transport mechanism reverses automatically at the end of one directional run. The telephone numbers recorded on the tape are separated by stop tones which divide the tape into even intervals, these telephone numbers being recorded on alternate tracks. The tracks on which the telephone dial numbers are recorded, are changed only when a subscriber is added or removed. The other two tracks are recording tracks on which the meter readout signals are recorded. These meter readout tracks are erased as the next meter reading is to be recorded. Two telephone lines are utilized so that dialing and readout may occur simultaneously and the information correlated on the recording tape.

At the recording station, interrogation tones are dispatched through the telephone lines to which the dialed meter stations respond by initiating a readout cycle during which time all of the meter dials are successively read. The meter readings are transmitted through the same telephone lines in the form of different frequency tones generated at the meter reading stations and recorded at the recording station on the meter readout portions of the tape. The interrogation tone operates a relay at the meter reading station so as to short the line and trip the ring before it is dispatched from the central office. This is done so that the subscriber is not signalled unnecessarily. Also, the initial response tone dispatched from the meter reading station signals the recording station that the line is ready to proceed with the readout cycle. The interrogation tone is interrupted intermittently so as to obtain successive readings of the various dials at the meter reading station. After the readout cycle is completed, the telephone line is released and ready for regular use. The readout cycle may hold the telephone lines for about five to 13 seconds depending on the number of meter dials to be read. The recording station also is provided with facilities so that if no tone is received in response to dialing, after a predetermined waiting period it will release. In this way, a busy line or malfunction in the communication system will cause the recorder to release the line. The meter reading circuit at the meter reading station on the other hand will release if the interrogation tone is interrupted for the same waiting period. Thus, any malfunction at the recording station during readout will cause re-set of the meter reading circuit in preparation for communication between the subscriber and the recording station or from the central telephone office. If a busy line is encountered and re-dialing operation is not successful, no meter reading will be recorded on the tape. At the accounting center, when the readout machine arrives at the blank spaces on the readout portion of the tape, a special card may be punched and sorted into a separate bin from which manual dialing and visual readout is resorted to.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a communication system having a plurality of message lines interconnecting remotely spaced stations and a central control through which any station may be selected from another station for message transmission therebetween, interrogatory recording means operatively connected to the message lines at one of said stations for recording of readout signals and simultaneous dispatch of interrogation signals to selected stations having message receiving devices, a plurality of meters located at each of said selected stations, and meter reading means operatively connected to the message lines and the meters at each of said selected stations for generating said readout signals and means for disabling the message receiving device and dispatching said readout signals through said lines in response to receipt of said interrogatory signals.

2. In combination with a communication system having a plurality of message lines interconnecting remotely spaced stations and a central control through which any station may be selected from another station for message transmission therebetween, interrogatory recording means operatively connected to the message lines at one of said stations for recording of readout signals and dispatch of interrogation signals to selected stations having message receiving devices, a plurality of meters located at each of said selected stations, and meter reading means operatively connected to the message lines and the meters at each of said selected stations for disabling the message receiving device and dispatching said readout signals through said lines for recording by the interrogatory recording means in response to receipt of said interrogatory signals therefrom, said interrogatory recording means comprising, line switching means connected to at least two message lines for interchangeably routing interrogatory and readout signals through one line and station selecting signals through the other line, a meter readout recorder having a recording medium on which said readout signals and the station selecting signals are recorded, dialing means operatively connected to the recorder and the line switching means for alternatively transmitting the station selecting signals originating from the recording medium to said two lines in succession, means for generating said interrogatory signals, and signal control means operatively connecting the recorder and the signal generating means to the line switching means for simultaneously routing the interrogation signals to one of said two lines and the readout signals in said one line to the recorder.

3. The combination of claim 2 wherein said signal generating means comprises, a plurality of oscillators having outputs of different frequencies, selective control means interconnecting said oscillators for superimposing different combinations of outputs from said oscillators, and interrupter means operatively connecting said oscillators to the line switching means for supply thereto of intermittently interrupted, superimposed outputs of the oscillators forming said interrogatory signals.

4. The combination of claim 3 including signal read-in means operatively connected to the recorder and the signal generating means for selectively forming station selecting signals to be recorded on the recording medium.

5. The combination of claim 4 wherein said recording medium comprises, a recording tape having a plurality of signal tracks thereon including a dial number signal track and a meter readout signal track, said dial number signal track bearing station selecting information on equal spaced portions thereof, and said meter readout signal track having corresponding portions of equal length immediately following each of said spaced portions on which corresponding meter readout signals are recorded, said recorder including an erase head aligned only with the meter readout signal track.

6. The combination of claim 5 including busy line waiting means operatively connected to the signal control means for temporarily interrupting operation of the dialing means in the absence of any readout signals following dispatch of the interrogatory signals and redialing means operatively connected to the recorder for reversal in movement of the recording medium during said interruption in operation of the dialing means.

7. The combination of claim 6 wherein said meter reading means comprises, a variable frequency oscillator, position responsive tuning means mounted on each of the meters for varying the output frequency of the oscillator, intermittently advanced switch means sequentially connecting the oscillator to each of the meters in response to receipt of said interrogatory signals, and means initially responsive to said interrogatory signals for switching the line from the message receiving device to the oscillator for a timed interval.

8. The combination of claim 1 wherein said meter reading means comprises, a variable frequency oscillator, position responsive tuning means mounted on each of the meters for varying the output frequency of the oscillator, intermittently advanced switch means sequentially connecting the oscillator to each of the meters and means responsive to intermittent receipt of said interrogatory signals for connecting the oscillator to the message lines and operating the switch means.

9. In a meter reading system, a readout recording mechanism connected to at least two communication lines, said recording mechanism comprising, line switching means for interchangeably routing interrogatory and readout signals through one line and station selecting signals through the other line, a meter readout recorder having a recording medium on which said readout signals and the station selecting signals are recorded, dialing means operatively connected to the recorder and the line switching means for alternatively transmitting the station selecting signals originating from the recording medium to said two lines in succession, means for generating said interrogatory signals, and signal control means operatively connecting the recorder and the signal generating means to the line switching means for simultaneously routing the interrogation signals to one of said two lines and the readout signals in said one line to the recorder.

10. The combination of claim 9 wherein said signal generating means comprises, a plurality of oscillators having outputs of different frequencies, selective control means interconnecting said oscillators for superimposing different combinations of outputs from said oscillators, and interrupter means operatively connecting said oscillators to the line switching means for supply thereto of intermittently interrupted superimposed outputs of the oscillators forming said interrogatory signals.

11. The combination of claim 10 including signal read-in means operatively connected to the recorder and the signal generating means for selectively forming station selecting signals to be recorded on the recording medium.

12. The combination of claim 11 including busy line waiting means operatively connected to the signal control means for temporarily interrupting operation of the dialing means in the absence of any readout signals following dispatch of the interrogatory signals and redialing means operatively connected to the recorder for reversal in movement of the recording medium during said interruption in operation of the dialing means.

13. The combination of claim 9 wherein said recording medium comprises, a recording tape having a plurality of signal tracks thereon including a dial number signal track and a meter readout signal track, said dial number signal track bearing station selecting information on equal spaced portions, thereof, and said meter readout signal track having corresponding portions of equal length immediately following each of said spaced portions on which corresponding meter readout signals are recorded, said recorder including an erase head aligned only with the meter readout signal track.

14. In combination with a system for telemetering information at a plurality of remote stations, a recording medium comprising, a recording tape having a plurality of signal tracks thereon including a dial number signal track and a meter readout signal track, said dial number signal track bearing station selecting information on equal spaced portions thereof, and said meter readout signal track having corresponding portions of equal length immediately following each of said spaced portions on which corresponding meter readout signals are recorded.

15. In combination with the recording medium defined in claim 14, an accounting unit comprising, a tape reader device simultaneously receiving station selecting signals and meter readout signals from the tape, means for simultaneously converting said signals into digital pulses, means for transferring said digital pulses along two paths, and means for intermittently interchanging the paths along which the converted station selecting and meter readout signals are transferred.

16. In a system for telemetering information through communication lines connected to a message receiving device, a plurality of meters having movable indicators, a variable frequency oscillator, means responsive to the position of said indicators on the meters for varying the output frequency of the oscillator, intermittently advanced switch means sequentially connecting the oscillator to each of the meters in response to receipt of interrogatory signals, and means initially responsive to advancement of the switch means for disconnecting the message receiving device from the lines for a timed interval during which the oscillator intermittently transmits readout signals corresponding to said meters.

17. The combination of claim 16 including dual frequency relay means connected to said line for shorting the lines and connecting the oscillator to the lines in response to said interrogatory signals, and timer means responsive to said initial advancement of the switch means for resetting the switch means following said timed interval.

18. In a telemetering system, a recording station having a dialing mechanism, a recording medium controlling operation of the dialing mechanism, means for recording readout data on the recording medium, means for generating interrogation signals to seek said readout data from a plurality of metering stations dialed by said dialing mechanism, and selectively controlled means connected to said signal generating means and operative on the recording medium for changing the metering stations dialed by the dialing mechanism.

References Cited

UNITED STATES PATENTS

| | | | |
|---|---|---|---|
| 2,591,617 | 4/1952 | Savino | 340—150 |
| 3,266,018 | 8/1966 | Higgins | 179—2 X |

ROBERT L. GRIFFIN, *Primary Examiner.*

JOHN W. CALDWELL, *Examiner.*

J. T. STRATMAN, *Assistant Examiner.*